United States Patent [19]

Pollman

[11] 4,382,991
[45] May 10, 1983

[54] SIZING COMPOSITION AND SIZED STRAND USEFUL AS REINFORCEMENT

[75] Inventor: Gary A. Pollman, Sylvania, Ohio

[73] Assignee: PPG Industries, Inc., Pittsburgh, Pa.

[21] Appl. No.: 257,084

[22] Filed: Apr. 24, 1981

Related U.S. Application Data

[62] Division of Ser. No. 72,713, Sep. 4, 1979, Pat. No. 4,301,052.

[51] Int. Cl.$^3$ .................... B23B 17/02; B23B 17/04
[52] U.S. Cl. .................................. 428/391; 65/3.41; 65/3.43; 65/3.44; 428/392
[58] Field of Search ............... 65/3.41, 3.43, 3.44; 428/378, 391, 392

[56] References Cited

U.S. PATENT DOCUMENTS

| | | | |
|---|---|---|---|
| 3,653,957 | 4/1972 | Schafer et al. | 428/394 |
| 3,803,069 | 4/1974 | McWilliams | 260/29.2 TN |
| 3,814,592 | 6/1974 | McWilliams et al. | 65/3 |
| 3,997,306 | 12/1976 | Hedden | 65/3.41 |
| 4,137,209 | 1/1979 | Wong | 260/29.6 NR |

OTHER PUBLICATIONS

"Cationic Organo Functional Silane Coupling Agents", Plueddemann et al., 27th Ann. Tech. Conf., 1972, Reinforced Plastics/Composites Institute, The Society of the Plastics Industry.

*Primary Examiner*—William F. Smith
*Attorney, Agent, or Firm*—Kenneth J. Stachel

[57] ABSTRACT

Sizing compositions having polyurethane latex, cationic silane having unsaturation and polyamino silane are provided. The compositions are used to treat glass fibers to produce sized glass fibers having improved physical properties such as integrity. The sized glass fibers when used with molding compounds yields molded articles with improved physical properties like tensile strength, flexural strength and articles with impact strength.

13 Claims, No Drawings

SIZING COMPOSITION AND SIZED STRAND USEFUL AS REINFORCEMENT

This is a division of application Ser. No. 72,713, filed Sept. 4, 1979 now U.S. Pat. No. 4,301,052.

BACKGROUND OF THE INVENTION

The present invention relates to a sizing composition and sized glass fiber strand useful in reinforcing polymers.

More particularly the present invention relates to a sizing composition for glass fibers to produce sized glass fibers with improved performance in polymeric molding compounds.

Reinforced thermosetting plastics can be reinforced with several forms of glass fibers including roving, continuous strand, chopped fibers, mat, woven fabrics and the like. The reinforced thermosetting plastic composites can be produced from thermosetting molding compounds like bulk molding compounds and sheet molding compounds, that typically have about 15 to 25 and 25 to 45 percent glass content respectively. Two families of fiber glass reinforced molding sheets that have recently been commercialized are the XMC® composites and HMC® composites available from PPG Industries, Inc., Pittsburgh, Pennsylvania. These composites have high-strength for structural uses. The HMC® composite offers isotropic strength properties approaching twice those of conventional sheet molding compound by employing high glass fiber content with little or no filler. XMC® composite is a directionally oriented, moldable resin-glass fiber sheet containing 65 to 75 percent continuous reinforcement.

The glass fibers used as reinforcement for the thermosetting molding sheets are formed by being drawn at a high rate of speed from molten cones of glass from tips of small orifices in a platinum device called a bushing. In order to protect the glass fibers from interfilament abrasion during formation and further processing and to make them compatible with polymeric materials like the thermosetting materials, a sizing composition is applied to the glass fibers during their formation.

In order to form acceptable fiber glass reinforced molding composites, the glass fibers must have an acceptable sizing composition on their surface. The sizing compositions conventionally contain lubricants, film formers, coupling agents, wetting agents, emulsifiers, and the like. The solubility of the glass fiber sizing composition in ethylenically unsaturated organic solvents can affect the final properties of the molded product, because a myriad of applications of sized glass fibers in thermosetting molding composites utilize unsaturated polyesters or vinyl ester resins. In instances where severe shear is necessary to disperse the glass fibers through the polyester premix, it is desirable to have a sizing composition which is substantially insoluble or totally insoluble in the polyester resin premix to prevent filamentation of the strand, i.e., to keep the filaments in discreet bundles. For example, bulk molding compounds, which are chemically thickened premixed resins having a mixture of the resin and monomer with an inert filler, glass fiber reinforcement, a catalyst and possible other additives, are prepared by mixing the components in a high shear mixer. The unaged polyester monomer solution, having a thickening agent and other ingredients, having dispersed homogeneously throughout the resinous phase the chopped glass fiber strand or roving as glass fibers by the action of the high shear mixer. The bulk molding compound produced from the mixing after thickening on aging can be sliced into desired shapes such as cubes and the like and placed in a press to form articles of the desired design.

When severe shear is not necessary to homogeneously disperse the glass fiber strand throughout the polyester or vinyl ester premixed during compounding and molding, increased solubility of the sizing composition on the strand can be tolerated.

If the sizing composition on the glass fibers is not properly formulated, the fibers will not disperse uniformly throughout the resin premix. The characteristic of the molding compound formed from the polyester and glass fibers which describes the homogeneity of the premix composite is called "wet-strength" or "flow-through". It is desirable to have a high degree of wet-through in a bulk molding compound, sheet molding compound, and the HMC® composites and the XMC® composites, in order that the final physical properties of the composites and the processibility thereof are at their maximum level.

On the other hand, it is also desirable that the glass fiber strand be wet-out during compounding which means that the resin encapsulates the glass fiber strands and no bare glass is visible throughout the formed molded compound. Wet-out during compounding is a measure of the apparent intimacy of contact between the resin matrix and the glass fiber strand. If the glass fiber strands are not immediately wet-out following compounding it is not expected that they will wet-out on aging due to the increase in the viscosity of the compound. This leads to adverse effects on the processibility, molding characteristics, and surface properties of the final molded article or composite.

It is the object of the present invention to provide a sizing composition to give glass fibers improved wet-through or flow-through properties and better or improved wet-out properties.

It is an additional object of the invention to provide a sizing composition which yields improved physical properties such as integrity between the glass fibers and the resin of a thermosetting molding compound in the production of thermosetting molding sheet composites.

It is a further additional object of the invention to provide a sizing composition which yields improved integrity between glass fibers and polyester, vinyl ester or epoxy resins where severe shear is necessary to disperse the glass fibers throughout the resin premix, for example, in the preparation of bulk molding compound.

It is another further object of the invention to provide sized glass fibers in the form of continuous strand, chopped fibers, mat, or roving and woven fabrics that have improved integrity, wet-out and wet-through in use for the preparation of reinforced thermosetting molding composites.

It is a further additional object of the invention to provide a sizing composition for glass fibers that yields sized glass fiber strands having improved integrity and reduced degradation in polyester resins, vinyl ester resins, and epoxy resins during the severe abuse experienced by the glass fibers during the injection process in the production of HMC® composites.

It is a further additional object of the present invention to provide sized glass fiber strands that can be used in reinforced thermosetting molding composites that leads to improved physical properties of the composites.

SUMMARY OF THE INVENTION

According to the invention, there is provided an aqueous sizing composition having an aqueous emulsion of curable polyurethane polymer, one or more cationic methacrylate-functional silanes and one or more amino-functional silanes.

Also, in accordance with this invention glass fibers are provided that have at least a portion of their surface in contact with the residue produced by removing water from an aqueous sizing composition present on the fibers and having one or more curable polyurethane polymers, one or more cationic methacrylate functional silanes and one or more amino-functional silanes.

In addition, according to the present invention a method is provided for imparting to glass fibers improved integrity by treating the glass fibers at forming with an aqueous sizing composition having an aqueous emulsion of one or more curable polyurethane polymers, one or more cationic methacrylate-functional silanes and one or more amino-functional silanes.

In the composition, sized glass fiber and method of the present invention additional ingredients can be used that are conventionally used with glass fiber sizing compositions. Also, the amounts of the polyurethane, and silanes generally used are respectively those amounts necessary to be effective in providing a partial or complete film on the glass fibers and in providing adhesion between the film former and glass fibers.

DETAILED DESCRIPTION OF THE INVENTION

The sizing composition and method of sizing glass fibers of the present invention provide sized glass fibers for use as reinforcement in polymeric molding compositions wherein the sized glass fiber strands have improved physical properties such as integrity and the reinforced polymeric molded composite has better physical properties. The sizing composition, sized glass fiber strands and method of sizing glass fibers of the present invention can be used for any reinforcement application, but it is preferred to use the composition, strands and method with bulk molding compounds to produce thermoset bulk molding composites. Examples of other reinforcement applications would include the use of the sizing composition, sized glass fibers and method of sizing of the present invention with sheet molding compounds or in the production of HMC® composites. The form of glass fiber that has the sizing composition of the present invention can be any conventional form, for example, chopped strand, roving, woven glass fiber strand and the like, but the preferred form is the chopped glass fiber strand. For the preferred glass fiber strand any conventional method of producing the chopped strand can be used.

The aqueous sized composition has a solid content from about 1 to about 20 weight percent, but can also have a high solids content of materials greater than 20 weight percent. In its preferred form the sizing composition will contain about 3 to about 10 weight percent solids content.

Aqueous emulsions of curable, blocked or unblocked polyurethane resins that are useful in the present invention are aqueous solutions of polyurethane polymers formed by reaction of an organic isocyanate or polyisocyanate with an organic polyhydroxylated compound or hydroxyl terminated polyether or polyester polymer having present anionic and/or nonionic surfactant. Particularly suitable aqueous emulsions of polyurethane polymers are designated "Rucothane Latex 2010L, 2030L, 2040L, 2050L, and 2060L" available from Ruco Division of Hooker Chemical Corporation, New York. These materials are thermoplastic urethane latices having a varying particle size of a high molecular weight aliphatic isocyanate based thermoplastic elastomer in a water dispersion with an anionic or nonionic surfactant. The amount of the thermoplastic polyurethane latex present in the sizing composition can vary from about 2 to about 40 weight percent and preferably about 5 to 18 weight percent of the sizing composition. The Rucothane latexes are based on aliphatic components having an ester backbone and have polymer solids content of the stabile emulsions ranging from 55 to 65 percent by weight. The Rucothane latexes have a Brookfield viscosity RVF 4 in centipoise at 2 RPM ranging from 7,000 for the 2060L and 2030L latexes up to 25,000 for the 2020L.

In the sizing composition of the present invention the major amount of the solids in the sizing composition is composed of the polyurethane latex, while the cationic methacrylate functional silane and polyamino functional silane are used in minor amounts.

It is also within the scope of the present invention to use more than one type of polyurethane polymer to make up the proper amount of polyurethane polymer in the sizing composition. Another type of polyurethane that is a non-exclusive example of polyurethane that can be used alone or in combination with the aforedescribed polyurethane latex produced from isocyanate monomer "Hylene W" available from E. I. Dupont de Nemours & Company. Also, other blocked or unblocked polyurethane latices can be used as long as the polyurethane latex can be cured by heat.

Any suitable cationic silane containing unsaturation may be used in the sizing composition of the present invention. The cationic silane with unsaturation can be used in the form of a quaternary salt or of the amine or amide hydrochloride salt. Non-exclusive examples of cationic silanes with unsaturation include: cationic, methacrylate functional silane having a formula similar to the following:

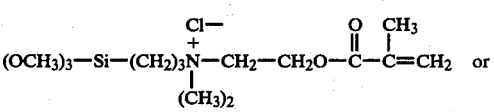

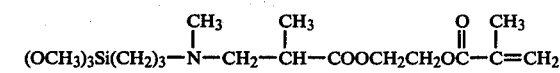

where the latter is prepared by the mono-addition of ethylene dimethacrylate; and cationic styrene functional silane having formula similar to the following:

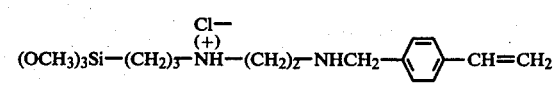

and cationic vinyl functional silane having a formula similar to the following:

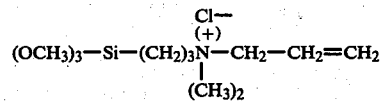

A cationic methacrylate or styrene functional silane are more fully described in and can be prepared in accordance with the teachings of E. P. Pluddenmann in "Cationic Organo-functional Silane Coupling Agents", Soc. Plast. Inc. RPC Proc. 27, 21B (1972) hereby incorporated by reference. The quaternary salts or amine or amide hydrochloride salts can be prepared in accordance with methods common in the art like the quaternization of amines and amides.

One cationic methacrylate functional silane particularly suitable in the sizing composition of the present invention is designated "Y-5823" available from Union Carbide Corporation. Other cationic silanes containing unsaturation that can be used include the methacrylate functional "Z-6031" silane and styrene functional "Z-6032", silane available from Dow Corning Corporation, and the styrene functional "Y-9014" silane available from Union Carbide Corporation. The amount of cationic silane with unsaturation, preferably methacrylate functionality, used in the sizing composition is in the range of about 0.05 to about 2 weight percent based on the total sizing composition.

In the sizing composition of the present invention, any polyamino functional silane is used. Such polyamino silanes have the formula:

$$[H-(NH-CH_2-CH_2)_a-NH(CH_2)_3]_n SiX_{4-n}$$

wherein n is an integer from 1 to 3, a is an integer from 1 to 5 and X is a readily hydrolyzable group such as an alkoxy with one to four carbon atoms or a halogen. Non-exclusive examples of polyamino silanes that can be used include:
N-(beta-aminoethyl)-gammaaminopropyltrimethoxysilane
N-(beta-dimethylaminoethyl)-gammaaminopropyltrimethoxysilane
N-(beta-aminoethylaminoethyl)-gammaaminopropyltrimethoxysilane
N-(gamma-aminopropyl)-gammaaminoisobutylmethyldiethoxysilane
N-(beta-aminoethyl)-gammaaminopropyltrithoxysilane A particularly suitable polyamino functional silane is the preferred diamino silane available from Dow Corning Corporation that is N-(2-aminoethyl)-3-aminopropyltrimethoxysilane in a concentration of 40 percent in methanol. Another diaminosilane like "Z-6020" silane available from Dow Corning Corporation can be used. The amount of polyamino silane used in the sizing composition is in the range of about 0.05 to about 2 weight percent based on the total sizing composition.

In addition to the polyurethane polymer, cationic silane with unsaturation, and polyamino silane components of the sizing composition, additional agents may be added to the sizing composition although it is preferred that the sizing composition contains only the polyurethane polymer, cationic methacrylate functional silane and polyamino silane. Non-exclusive examples of the additional agents that can be used in the sizing composition include coupling agents, such as gamma-aminopropytriethoxysilane, beta-(3,4-epoxycyclohexyl)-ethyltrimethoxysilane and vinyl tris (2-methoxyethoxy)silane; curing agents, such as Ruco Catalyst available from Hooker Corporation, cross-linking agents such as Cymel 370, available from American Cyanamid and other similar additives. In addition, melamine containing agents such as "Tybon A" and polyamide-containing agents such as "Tybon B" both available from Pacific Resins and Chemicals Co., Washington 98421 can be incorporated into the sizing composition of the present invention.

In the preferred embodiment of the present invention, the sizing composition contains the polyurethane latex, cationic methacrylate functional silane, and diaminosilane and the method for preparing this preferred sizing composition involves the following steps. First, cationic silane with unsaturation and the polyamino silane are added respectively to a sufficient amount of water to adequately disperse the silanes and then they are combined. Second, the polyurethane latex emulsion is diluted in water and then added to the diluted silanes. Then the components are diluted to the final desired volumn. All of the aforementioned steps are accomplished in the presence of a sufficient amount of mixing of the components.

After the sizing composition has been formed as stated above, it is pumped in a recirculating fashion to a binder applicator which applies the sizing to the glass filaments during formation. The glass fibers are formed in the conventional manner by applying the sizing composition by a belt-type applicator gathering the individual glass fibers into a strand, and collecting strand on a forming tube which is mounted on a winder. The forming package is removed from the winder and dried in a forced air oven or a dielectric oven until substantially all the water is removed therefrom usually at a temperature of around 270° F. (132° C.). Subsequent to drying the sized glass fibers can be unwound and used for reinforcement, fabricated into chopped strand, formed into roving or the like for use in molding compounds like bulk molding, sheet molding compounds, HMC® composites, XMC® composites and reaction injection molding, although the sized glass fibers are preferred for use in bulk molding compounds where the best improvement in physical properties is obtained.

It is preferred in the treatment of the glass fibers in formation of strand with the sizing composition that the amount of composition placed on the strand is around 0.2 to about 3 weight percent.

The invention will be further elucidated by the following Examples.

EXAMPLE I

A sizing composition was prepared having the following formulation:

| Ingredient | % by weight of total Size |
| --- | --- |
| Polyurethane resin (Rucothane 2010L resin Hooker Chemical Co.) | 14.0 |
| Cationic methacrylate functional silane ("Y-5823" Union Carbide Corp.) | 0.5 |
| Diamino silane (Z-6026 silane Dow Corning Chemical Co.) | 0.8 |

The formulation was prepared by adding the cationic methacrylate functional silane and the diaminosilane to a sufficient amount of water to disperse each silane. The diluted silanes are combined and to them there was added the diluted polyurethane resin. This diluted polyurethane resin is produced by adding the Rucothane 2010L resin to a sufficient amount of water to disperse the resin. The mixture in the main mix tank is then diluted to the desired volume. During the preparation of the formulation, adequate mixing is provided in the main mix tank where the silanes are combined and in mix tanks where dilution of the various components occur.

This sizing composition was applied to glass fibers in forming K-37 glass fiber strands. The fibers were formed in the conventional manner as aforedescribed. The forming package of the K-37 glass fiber strands was dried for about 11 hours at about 270° F. (132° C.). The glass fiber strand was chopped into ⅛ inch (0.318 cm), ¼ inch (0.635 cm) and ½ inch (1.27 cm) chopped strand in a conventional process and apparatus. Forming was accomplished in an acceptable manner and chopping performance was excellent. The chopped strands were evaluated for filamentation, and LOI by methods well known to those skilled in the art. The results for this evaluation were:

| Chopped Strand | Filamentation | LOI |
|---|---|---|
| ¼" | 0.2/0.3 | 1.7% |

The chopped strand was combined with bulk molding compound for compression and injection molding. The molded article was evaluated for impact strength, tensile and flexural strength against molded articles prepared in the same manner with commercial chopped strand. The evaluation gave the following results:

| Molded Physical Properties of Thermoset Polyester | | | | | | | |
|---|---|---|---|---|---|---|---|
| | | BMC | | | Physical Properties | | |
| Base Strand | Type Compound | Content FG % | Resin % | Filler % | Tensile Strength PSI (10)³ | Flexural Strength PSI (10)³ | Flexural Modulus PSI (10)⁶ | Notched Izod Ft-lbs/in |
| Commercial ½ inch PPG-3029 | CM¹ IM² R³ | 22. | 33.6 | — | 2.9(22.1) 4.2(20.7) 144 | 11.1(34.9) 8.4(22.2) 78 | 1.20(13.1) 1.21(8.25) | 5.63(43.8) 3.54(26.6) 63 |
| Example 1 ½ inch | CM IM R | 25.7 | 32.9 | — | 4.7(23.0) 5.2(26.5) 111 | 12.0(41.1) 10.0(28.0) 83 | 1.28(12.4) 1.24(12.3) | 6.62(57.3) 3.71(29.5) 56 |

Notes:
¹Data on First Line across represent testing of compression molded (CM) 9 × 16 inch panels.
²Data on Second Line across represent testing on injection molded (IM) 8 inch sq. panels.
³Data on the third line across represent testing of reaction injection molded samples. Data for each test type represent overall averages to account for fiber glass orientation effects.
Values in ( ) represent coefficient of variation percentages.

The results shown above and other results obtained comparing molded samples using chopped strand made in accordance with the present invention with molded samples using commercially available chopped strand show the benefit of the present invention. These benefits are improved impact strength of the molded article while achieving similar or improved tensile strength and flexural strength and modulus. For example, the molded article using chopped strand in accordance with the present invention compared to molded articles with commercially available chopped strand gave:

| Tensile strength | 10% > commercial |
|---|---|
| Flex strength | 10% > commercial |
| Impact strength | 10% > commercial |

The foregoing has described a sizing composition having a polyurethane latex, cationic silane with unsaturation and polyamino silane. This sizing composition when applied to glass fibers during their formation yields sized glass fiber strands that have improved physical properties such as integrity. Glass fibers sized with the sizing composition of the present invention produced molded articles having improved physical properties such as impact strength, and flexible strength.

I claim:

1. Glass fiber strand for use as reinforcement with molding compounds having a dried residue of an aqueous sizing composition where the dried residue constitutes 0.2 percent to 3 percent of said glass fiber strand and, said aqueous sizing composition comprises in weight percent of the aqueous sizing composition: 2 to 40 weight percent of curable polyurethane latex as the sole polymeric film former, 0.05 to about 2 weight percent of a cationic silane having unsaturation, and about 0.05 to about 2.0 weight percent of polyamine silane, and water in the remaining amount.

2. The sized glass fibers of claim 1 that are chopped glass fibers.

3. The method of forming glass fiber strand for use as reinforcement with molding compounds to produce molded articles, which comprises drawing glass streams from orifices in a bushing to form individual glass fibers; moving the fibers from the bushing at a high rate of speed and forming them into a strand; applying to the fibers, while they are moving at this speed and before strand formation an aqueous sizing solution; comprising: about 2 to about 40 weight percent of curable polyurethane latex as the sole polymeric film former, about 0.05 to about 2.0 weight percent of cationic silane with unsaturation and about 0.05 to about 2.0 weight percent of a polyamine silane, and water in an amount to give a solids content from about 1 to about 20 weight percent where all the weight percentages are based on the total sizing composition; drying the strand so formed and chopping said strands.

4. Method of claim 3, wherein the polyurethane latex has a solids content of about 55 to about 65 weight percent of the latex, and the cationic silane has a methacrylate functionality and is 50 percent active in a compatible solvent, and the polyamino silane is a diamino silane that is 40 percent active in methanol.

5. Method according to claim 4, wherein the polyurethane latex is diluted to have a solids content of around 30 to around 45 weight percent, and the cationic silane has a concentration of about 40 percent active in a compatible solvent and the polyamino silane has a concentration of around 40 percent active in water or alcohol solution.

6. Glass fiber strand of claim 1 or method of claim 3 wherein the curable polyurethane latex is a thermoplastic polyurethane.

7. Glass fiber strand of claim 1 or method of claim 3, wherein the aqueous sizing composition includes a curing agent for the polyurethane polymer.

8. The glass fiber strand of claim 1 or the method of claim 3, wherein the aqueous sizing composition includes melamine-containing or polyamide-containing material.

9. Glass Fiber strand of claim 1, wherein the cationic silane has methacrylate functionality.

10. Glass fiber strand of claim 9 or method of claim 4, wherein the methacrylate functional cationic silane is the monoaddition product of ethylene dimethacrylate and methylaminopropyltrimethoxysilane.

11. Glass fiber strand of claim 1 or method of claim 3, wherein the cationic silane has styrenic functionality.

12. Glass fiber strand of claim 1, wherein the polyamino silane is a diaminosilane.

13. Glass fiber strands of claim 1 or method of claim 3, wherein the cationic silane has vinyl functionality.

* * * * *